(12) United States Patent
D'Ercoli et al.

(10) Patent No.: US 10,509,660 B2
(45) Date of Patent: Dec. 17, 2019

(54) SYSTEMS AND METHODS FOR ASSESSING CONFIGURATION PROFILES FOR A USER CONFIGURABLE DEVICE

(71) Applicant: Datalogic IP Tech, S.r.l, Bologna (IT)

(72) Inventors: Francesco D'Ercoli, Bologna (IT); Marco Cumoli, Monte San Pietro (IT); Francesco Paolo Muscaridola, Bologna (IT)

(73) Assignee: Datalogic IP Tech, S.r.l, Bologna (IT)

( * ) Notice: Subject to any disclaimer, the term of this patent is extended or adjusted under 35 U.S.C. 154(b) by 173 days.

(21) Appl. No.: 15/727,333

(22) Filed: Oct. 6, 2017

(65) Prior Publication Data
US 2019/0108041 A1    Apr. 11, 2019

(51) Int. Cl.
*G06F 9/44* (2018.01)
*G06F 9/445* (2018.01)
*G06N 20/00* (2019.01)

(52) U.S. Cl.
CPC .......... *G06F 9/4451* (2013.01); *G06N 20/00* (2019.01)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS 5,890,204 A * 3/1999 Ofer ...................... G06F 3/0605
711/100
6,963,937 B1 * 11/2005 Kamper .................. G06F 3/038
345/156

(Continued)

FOREIGN PATENT DOCUMENTS

WO    2014088431 A1    6/2014

OTHER PUBLICATIONS

Rabiner, "A Tutorial on Hidden Markov Models and Selected Applications in Speech Recognition," *Proceedings of the IEEE* 77(2):257-286, 1989.

(Continued)

*Primary Examiner* — Zahid Choudhury
(74) *Attorney, Agent, or Firm* — Cozen O'Connor

(57) ABSTRACT

Systems and methods for assessing configuration profiles for a user configurable device. The configuration profile may include sets configuration parameters and an associated configuration parameter values that may be analyzed to determine a set of current states for the user configurable device. The set of current states may be used to identify a candidate state that is related to a candidate configuration profile. The candidate configuration profile may include at least one set of a candidate configuration parameter and an associated candidate configuration parameter value. One or more prompts may be rendered via the customer device to set at least one of the configuration parameters and associated configuration parameter values based on the corresponding candidate configuration parameter values. A response is received via the user interface to the prompt, and an indication of such response may be transmitted to update the identification of the subsequent candidate configuration profiles.

20 Claims, 11 Drawing Sheets

(58) Field of Classification Search
CPC ............. G06F 9/44514; G06F 9/44523; G06F 11/1417; G06F 9/44505
See application file for complete search history.

(56) References Cited

U.S. PATENT DOCUMENTS

| | | | |
|---|---|---|---|
| 8,670,979 B2 | 3/2014 | Gruber et al. | |
| 8,769,059 B1* | 7/2014 | Chheda | H04L 41/0866 705/26.5 |
| 8,788,113 B2 | 7/2014 | Filev et al. | |
| 9,094,299 B1* | 7/2015 | Rao D.S. | H04L 41/0813 |
| 9,405,427 B2 | 8/2016 | Curtis | |
| 2004/0172622 A1 | 9/2004 | Francis | |
| 2005/0050175 A1* | 3/2005 | Fong | G06F 9/44505 709/220 |
| 2005/0144528 A1* | 6/2005 | Bucher | G06F 9/44505 714/38.14 |
| 2007/0294669 A1* | 12/2007 | Robalewski | G06F 9/44505 717/120 |
| 2009/0174786 A1 | 7/2009 | Joseph | |
| 2010/0058185 A1 | 3/2010 | Commarford et al. | |
| 2011/0125989 A1* | 5/2011 | Amidon | G06Q 10/107 713/1 |
| 2013/0103933 A1* | 4/2013 | Huang | G06F 8/654 713/1 |
| 2013/0198569 A1* | 8/2013 | Eidelman | G06F 11/2268 714/32 |
| 2015/0186161 A1* | 7/2015 | Cho | G06F 9/44505 713/2 |
| 2015/0254080 A1* | 9/2015 | Zhang | G06F 9/4406 713/2 |
| 2015/0362976 A1* | 12/2015 | Caliendo, Jr. | G06F 1/3218 713/320 |
| 2018/0089131 A1* | 3/2018 | Burns | G06F 13/4068 |

OTHER PUBLICATIONS

Stamp, "A Revealing Introduction to Hidden Markov Models," Department of Computer Science, San Jose State University, Dec. 11, 2015, 21 pages.

Starner, "Visual Recognition of American Sign Language Using Hidden Markov Models," Thesis, Massachusetts Institute of Technology, Feb. 1995, 71 pages.

Antwarg, L., et al., "Attribute-Driven Hidden Markov Model Trees for Intention Prediction," IEEE Transactions on Systems, Man, and Cybernetics, Part C (Applications and Reviews), vol. 42, Issue 6, Nov. 2012, pp. 1103-1119.

International Search Report and Written Opinion of the International Searching Authority dated Jan. 29, 2019, issued in corresponding International Application No. PCT/EP2018/076903, dated Oct. 2, 2018, 12 pages.

* cited by examiner

SYSTEMS AND METHODS FOR ASSESSING CONFIGURATION PROFILES FOR A USER CONFIGURABLE DEVICE

TECHNICAL FIELD

The present disclosure relates to assessing and analyzing configuration profiles for user configurable devices.

BACKGROUND

Description of the Related Art

Configuring user configurable device (e.g., end user devices, embedded devices, mobile devices, and other such devices) may be a particularly tedious and time-consuming obligation. In addition, with a multitude of configuration parameters to set for each task performable by the user configurable device, there is an increased possibility that a user configurable device user or operator (i.e., end user) may enter conflicting configuration parameter values during the configuration process. Such conflicting values may not even be noticeable until the user configurable device malfunctions or produces anomalous, unexpected results. A non-optimal configuration may not be noticeable at all, which may cause the system with these sub-optimal configuration parameter values to perform at a lower level relative to the highest possible, optimal performance, thereby causing the end user to receive a worst service than possible without any evidence of such.

BRIEF SUMMARY

Artificial intelligence or machine learning techniques may be used to identify and potentially correct erroneous configuration profiles entered by the end users. Such artificial intelligence or machine learning techniques may adapt to the input by the user or operator over time, recognizing preferred configuration profiles as entered by the user or operator. Such flexible identification and analysis of entered configuration profiles may be preferable over rigid configuration wizards that may be difficult to keep updated.

A system to assess configuration profiles for a user configurable device, the configuration profiles each comprising at least one set of a configuration parameter and an associated configuration parameter value, may be summarized as including at least one processor; at least one nontransitory processor-readable storage device communicatively coupled to the at least one processor and which stores processor-executable instructions which, when executed by the at least one processor, cause the at least one processor to: receive at least one configuration parameter value; determine a set of current states based at least in part on the received at least one configuration parameter value; identify a candidate state based at least in part on the determined set of current states, the candidate state which is related to a candidate configuration profile, the candidate configuration profile which includes at least one set of a candidate configuration parameter and an associated candidate configuration parameter value; cause to be presented via a user interface a prompt to set at least one candidate configuration parameter based at least in part on the corresponding candidate configuration parameter value in the candidate configuration profile; receive via the user interface an indication of a response to the prompt to set the at least one configuration parameter; and generate an instruction that causes the at least one configuration parameter to be set according to the received indication of the response.

The processor executable instructions when executed may further cause the at least one processor to determine the current states in the set of current states based upon a set of emission probabilities that relate the received at least one configuration parameter value to each current state in the set of current states.

The processor executable instructions when executed may further cause the at least one processor to update at least one of the emission probabilities for at least one of the current states in the set of current states based at least in part upon the received indication of the response.

The processor executable instructions when executed may further cause the at least one processor to determine the candidate state based at least in part upon a transition probability that relates at least one of the current states in the set of current states to the candidate state.

The processor executable instructions when executed may further cause the at least one processor to update at least one of the transition probabilities for at least one of the current states in the set of current states based at least in part upon the received indication of the response. At least one transition probability for at least one current state in the set of current states may relate to remaining in the at least one current state.

The processor executable instructions when executed may further cause the at least one processor to determine a set of candidate states, wherein each candidate state within the set of candidate states is related to at least one of the current states in the set of current states by at least one transition probability.

The processor executable instructions when executed may further cause the at least one processor to determine the transition probability for each candidate state within the set of candidate states, wherein the at least one candidate configuration parameter that is presented in the prompt via the user interface corresponds to a candidate configuration parameter included with a candidate configuration profile related to a candidate state within the set of candidate states that has the highest transition probability.

The processor executable instructions when executed may further cause the at least one processor to update at least one transition probability for one or more candidate states within the set of candidate states based at least in part upon the received indication of the response. The set of candidate states may include at least one of the current states within the set of current states. Determining the set of current states may be based at least in part on a Hidden Markov Model. Determining the candidate state may be based at least in part on a Hidden Markov Model. Determining the one or more current states in the set of current state may be based at least in part on one or more preconfigured emission probabilities. Determining the candidate state may be based at least in part on one or more preconfigured transition probabilities.

The system may further include a graphical user interface that presents the prompt to set the at least one candidate configuration parameter.

The graphical user interface may further present a display to input the at least one configuration parameter value. The system may be part of the user configurable device.

The processor executable instructions when executed may further cause the at least one processor to transmit the instruction that causes the at least one configuration parameter to be set to the user configurable device, wherein the user configurable device sets the at least one configuration parameter according to the transmitted instructions.

Receiving at least one configuration parameter value may further include receiving a plurality of configuration parameter values, and determining the set of current states may further include determining the set of current states based at least in part on each configuration parameter value in the plurality of configuration parameter values. Each of the configuration parameter values in the plurality of configuration parameter values may be associated with a configuration task.

A method for determining a candidate configuration profile from a plurality of configuration profiles, each configuration profile comprising at least one set of a configuration parameter and an associated configuration parameter value, may be summarized as including receiving by at least one processor at least one configuration parameter value; determining by the at least one processor a set of current states based at least in part on the received at least one configuration parameter value; determining by the at least one processor a candidate state based at least in part on the determined set of current states, the candidate state which is related to the candidate configuration profile comprising at least one set of a candidate configuration parameter and an associated candidate configuration parameter value; causing to be presented via a user interface a prompt to set at least one candidate configuration parameter based at least in part on the corresponding candidate configuration parameter value in the candidate configuration profile; receiving via the user interface an indication of a response to the prompt to set the at least one configuration parameter; and generating by the at least one processor an instruction that causes the at least one configuration parameter to be set according to the received indication of the response.

The method may further include determining the current states in the set of current states based upon a set of emission probabilities that relate the received at least one configuration parameter value to each current state in the set of current states.

The method may further include updating at least one of the emission probabilities for at least one of the current states in the set of current states based at least in part upon the received indication of the response.

The method may further include determining the candidate state based at least in part upon a transition probability that relates at least one of the current states in the set of current states to the candidate state.

The method may further include updating at least one of the transition probabilities for at least one of the current states in the set of current states based at least in part upon the received indication of the response. At least one transition probability for at least one current states in the set of current states may relate to remaining in the at least one current state.

The method may further include determining a set of candidate states, wherein each candidate state within the set of candidate states is related to at least one of the current states in the set of current states by at least one transition probability.

The method may further include determining the transition probability for each candidate state within the set of candidate states, wherein the at least one candidate configuration parameter that is presented in the prompt via the user interface corresponds to a candidate configuration parameter included with a candidate configuration profile related to a candidate state within the set of candidate states that has the highest transition probability.

The method may further include updating at least one transition probability for one or more candidate states within the set of candidate states based at least in part upon the received indication of the response. The set of candidate states may include at least one of the current states within the set of current states. Determining the set of current states may be based at least in part on a Hidden Markov Model. Determining the candidate state may be based at least in part on a Hidden Markov Model. Determining the one or more current states in the set of current state may be based at least in part on one or more preconfigured emission probabilities. Determining the candidate state may be based at least in part on one or more preconfigured transition probabilities.

The method may further include rendering a graphical user interface that presents the prompt to set the at least one candidate configuration parameter.

The graphical user interface may further present a display to input the at least one configuration parameter value.

The method may further include transmitting the instruction that causes the at least one configuration parameter to be set to the user configurable device, wherein the user configurable device sets the at least one configuration parameter according to the transmitted instructions.

Receiving at least one configuration parameter value may further include receiving a plurality of configuration parameter values, and determining the set of current states may further include determining the set of current states based at least in part on each configuration parameter value in the plurality of configuration parameter values. Each of the configuration parameter values in the plurality of configuration parameter values may be associated with a configuration task.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1A:
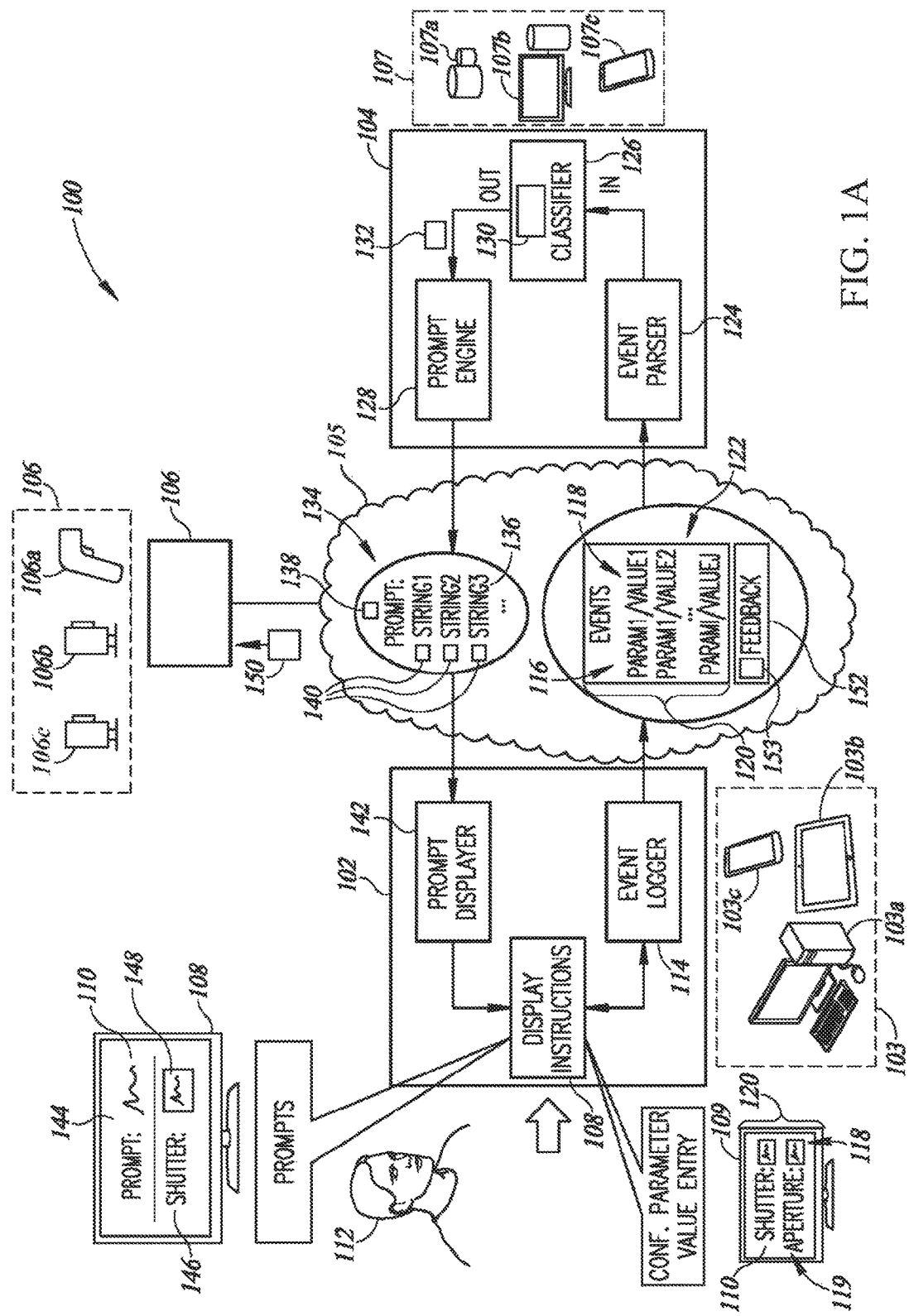
FIG. 1A is a schematic diagram that shows a configuration system in which a user interaction subsystem, a configuration-analysis component, and a user configurable device are implemented on separate devices that are communicatively coupled via a network, according to at least one illustrated implementation.

FIG. 1A shows a configuration system 100 that may include a user interaction subsystem 102, a configuration-analysis subsystem 104, and a user configurable device 106a, 106b, 106c (collectively 106), in which the user configurable device 106 implements a configuration profile that has been entered via the user interaction subsystem 102 and analyzed by the configuration-analysis subsystem 104. In some implementations, the user configurable device 106 may be an end user device 106a, an embedded device 106b, or a remote device 106c. The user configurable device 106 may be user or operator configurable via a user interface by selecting or otherwise setting one or more configuration parameters, discussed below, associated with various tasks or settings for the user configurable device 106. The configuration parameters values for one or more of the configuration parameters may be set or modified by an end user via the user interaction subsystem 102, using, for example, a user interface (e.g., a graphical user interface ("GUI")). The user interaction subsystem 102 may be implemented via one or more processor-enabled devices 103, such as, for example a desktop computer 103a executing a local client or a web client, a tablet device 103b, a mobile device 103c executing an application (app), or some other such similar device. The configuration-analysis subsystem 104 may analyze the configuration parameters and configuration parameter values entered by the user via the user interaction subsystem 102 and provide one or more prompts via the user interface to the user 112 regarding the configuration of the user configurable device 106. The configuration-analysis subsystem may be implemented via one or more processor-enabled devices 107, such as a server 107a, a desktop 107b, a mobile device 107c, or some other such similar device.

The user interaction subsystem 102, the configuration-analysis subsystem 104, and/or the user configurable device 106 may be communicatively coupled via a communications network 105. Communications over the communications network 105 may be via wired and/or wireless network architectures, for instance, wired and wireless enterprise-wide computer networks, intranets, extranets and the Internet. Such wireless communications may be via radio or microwave frequency communications, collectively referred to herein as RF communications). Other implementations of the communications network may include other types of technology including telecommunications networks, cellular networks, paging networks, and other mobile networks.

The user interaction subsystem 102 may include display instructions 108 and an event logger 114 that may be used to receive and process inputs from a user 112. In some implementations, the display instructions 108 are used to render a user interface 110 (e.g., a graphical user interface) for the user 112 to view, and may thereby receive data, parameters, and values that have been input into the user interface 110 by the user 112, via a display 109. Such a display 109 may be part of the processor-enabled device 103 that implements the user interaction subsystem 102. For example, the user interface 110 may be a structured form rendered onto the display 109 in which the form has one or more fields associated with a set of configuration parameters 116 for the user configurable device 106. In some implementations, such fields may receive alpha-numeric inputs, or inputs as indicated via, for example, a virtual slider bar, a virtual toggle switch, or some other such virtual representation. Such configuration parameters 116 may be used, for example, to configure the user configurable device 106 to perform a function or to engage a setting for a component on the user configurable device 106.

The user 112 may enter corresponding configuration parameter values 118 into the one or more fields for the configuration parameters 116. Each set of configuration parameter 116 and configuration parameter values 118 may form an event 119. The collection of events 119 (e.g., configuration parameters 116 and associated configuration parameter values 118) that are used to perform a specific task by the user configurable device 106 (e.g., perform a specific function or engage a specific setting) may form a configuration profile 120. In some implementations, the task or setting to be configured via a configuration profile 120 may be known in advance such that the appropriate fields may be included in the user interface 110 to receive the configuration parameter values 118.

The sets of configuration parameters 116 and associated configuration parameter values 118 that form the events 119 may be collected by the event logger 114. In some implementations, the event logger 114 is implemented via a database program or some similar type of program executed by one or more processors (e.g., microprocessors) on the user interaction subsystem 102. Such a program may maintain one or more tables to collect the events 119 that have been entered via the user interface 110. In some implementations, such tables may maintain the order in which each event 119 has been entered by the user 112. In some implementations, the event logger 114 may continue to maintain such a table, adding each additional event 119 as configuration parameter values are entered into the user interface 110, until the event logger 114 has collected a predefined number of configuration parameters 116 and associated configuration parameter values 118. At this point, the event logger 114 may transmit the received sets of configuration parameters 116 and configuration parameter values 118 to the configuration-analysis subsystem 104, while continuing to collect additional events 119 as further configuration parameter values 118 are entered into the user interface 110. In some implementations, the event logger 114 may collect an entire configuration profile 120 as entered by the user interface 110 and transmit the collection of events 119 that comprise the configuration profile 120 to the configuration-analysis subsystem 104. In some implementation, the event logger 114 may collect and transmit each event 119 to the configuration-analysis subsystem 104 as each configuration parameter value 118 is entered into the user interface 110.

The event logger 114 may transmit a set 122 of one or more events 119 to the configuration-analysis subsystem 104. The configuration-analysis subsystem 104 may include an event parser 124, a classifier 126, and a prompt engine 128. The event parser 124 may receive the events 119 or set of events 119 transmitted from the event logger 114 via the communications network 105. Upon receiving the events 119 and/or set of events 119 from the event logger 114, the event parser 124 may be used to process or otherwise prepare the events 119 to be further analyzed. As such, the event parser 124 may delete certain events 119 from the set of events 119, such as, for example, those events 119 that may have no impact during the further analysis. In some implementations, the event parser 124 may modify the ordering or grouping of certain events 119 within the set of events 119 in order, for example, to make the further processing of the events 119 more efficient. In some implementation, the deletion or modification of the events 119 and/or the set of events 119 may result in reducing the amount of memory that may be necessary to store the set of events 119 as part of the configuration-analysis subsystem 104. The event logger 114 may transmit the processed event 119 or set of events 119 to the classifier 126.

The classifier 126 may be used to analyze the events 119 and set of events 119 collected by the event logger 114 and/or processed by the event parser 124 in order to determine a candidate configuration profile. In some implementations, the classifier 126 is implemented by a machine-learning module 130 that may analyze the event 119, set of events 119, and/or current configuration profile 120 received from the event logger 114, for example to implement supervised machine learning or semi-supervised machine learning. Such a machine-learning module may include one or more statistical and/or probability models, such as a Hidden Markov Model, that the classifier 126 may use to analyze the received events 119, set of events 119, and/or current configuration profile 120, and determine and/or identify a candidate configuration profile comprised of one or more candidate configuration parameter values that differ from the current configuration parameter values. In some implementations, the classifier 126 may analyze the current event 119, set of events 119, and/or current configuration profile 120 to determine if the user 112 intended, instead, to implement the candidate configuration profile 120. In some instances, for example, the user 112 may make a mistake or error when entering one or more configuration parameter values 118 into the graphical interface 110. Such an error may go undetected by the user 112 such that the erroneous configuration parameter value 118 becomes part of the current configuration profile 120. By analyzing the event 119, set of events 119, and/or current configuration profile 120, the classifier 126 may detect the error, and determine a set of one or more candidate configuration profiles 120 that the user 112 may have intended to enter. The classifier 126 may use the one or more candidate configuration parameter values within the set of candidate configuration profiles as a basis for generating and transmitting recommended changes to the current configuration profile 120.

In some implementations, the classifier 126 may update or modify the analysis based upon previous events 119, sets of events 119, and/or configuration profiles 120 received from, or other actions taken by, the user 112. For example, in some instances, the user 112 may intend to use an unusual configuration profile 120 for a user configurable device 106 or set of user configurable devices 106, such as may occur, for example, when the user configurable device 106 is being used to perform a rare or infrequent task or is being used in a special or uncommon environment. In some implementations, upon receiving the unusual configuration profile, the classifier may generate and transmit a prompt message 132 to be provided to the user 112, via the user interface 110, to confirm that the unusual configuration profile 120 is to be used with the user configurable device 106 or set of user configurable devices 106. After receiving such confirmation, the classifier 126 may update or modify the analysis to recognize the unusual configuration profile 120 going forward. In some implementations, the configuration system 100 may receive information via the network 105 regarding configuration profiles 120 that have been entered by other users on user configurable devices that are the same as or similar to the user configurable device 106 that is part of the configuration system 100. As such, the classifier 126 may update or modify the analysis based upon the configuration profiles that have been implemented by the other users. In such a situation, the classifier 126 may weigh modifications to the analysis of the classifier 126 based on the configuration profiles applied by other users differently than such modifications based on the configuration profiles applied by the end user 112. For example, in some implementations, the classifier 126 may apply a greater weight to modifications of the analysis of the classifier 126 based on configuration profiles 120 applied by the end user 112 as opposed to configuration profiles entered by other users.

In some implementations, the classifier 126 analyzes each event 119 as the events 119 are input into the user interaction subsystem 102. In such an implementation the event logger 114 and the event parser 124 may pass each event 119 to the classifier 126 with little or no further processing. In such an implementation, the classifier 126 may analyze each event 119 in real-time and potentially use such real-time analysis to track the evolution of the configuration profile 120 over time. As such, the classifier 126 may detect potential errors or anomalies within a current configuration profile 120 as each event 119 that comprises the current configuration profile 120 is being entered. In some implementations, the classifier may analyze a set of events 119 up to and including a current configuration profile 120 to detect potential errors. Analyzing a set of events 119, including a current configuration profile 120, may reduce the complexity of the analysis, thereby reducing the amount of processing power, memory, and other resources that may be necessary to perform the necessary analysis in detecting potential errors.

The classifier 126 may determine and output one or more prompt messages 132 that describe modifications or changes, for consideration by the user 112, to be made to the current configuration profile 120 to arrive at one of the candidate configuration profile 120. Such a candidate configuration profile 120 may be, for example, the configuration profile that the classifier 126 has determined is the mostly likely configuration profile that the user 112 intended to implement. In one implementation, for example, the prompt messages 132 may provide potential modifications to be made to one or more configuration parameters 116 and/or configuration parameter values 118 within the current configuration profile 120 based upon the candidate configuration parameter values. In some implementations, the classifier 126 may output a prompt message 132 in the form of an encoded message that is transmitted to the prompt engine 128 in which the prompt messages 132 contain information directed towards making or implementing at least one of the changes or modifications.

The prompt engine 128 may receive the prompt message 132 from the classifier 126 and generate a prompt string 134 or set of prompt strings 134, each of which may be comprised of a human-readable message (e.g., a text message 136) that is transmitted to the user interaction subsystem 102. The message within the prompt string 134 may be used to provide a prompt to the user 112 to confirm certain configuration parameters 116 and/or configuration parameter values 118 that are part of the current configuration profile 120. The prompt string 134 may therefore be used to potentially highlight potential erroneous submissions of configuration parameter values 118 within the current configuration profile 120 and provide prompts 144 on the display 109 for correcting such submissions or values based upon one or more candidate configuration profiles. In some implementations, the prompt engine 128 may be comprised of one or more look up tables that may be used to match the encoded message included within the prompt message 132 received from the classifier 126 with a corresponding text message 136 that may be transmitted as part of the prompt string 134. In some implementations, the prompt engine 128 may generate a unique identification value 138 that is associated with each prompt string 134 and/or set of prompt strings 134 that are transmitted to the user interaction subsystem 102. In some implementations, each prompt string 134 may have an associated sequence number 140, generated and assigned by the prompt engine 128, in which the sequence numbers 140 may comprise an ordered set of sequence numbers 140 that may be used to determine or set an order for presenting the prompts associated with the prompt strings 134 to the user 112. Such order may be based upon, for example, a relative importance of the prompts, a sequential order in which the changes suggested by the prompts may need to be entered, or some other such order. The prompt engine 128 may transmit the prompt string 134 and/or set of prompt strings 134 to a prompt displayer 142.

The prompt displayer 142 may be implemented on the user interaction subsystem 102, and may receive the prompt string 134 and/or set of prompt strings 134 transmitted by the prompt engine 128 via, for example, the network 105. The prompt displayer 142 may process each received prompt string 134 such that a corresponding prompt 144 may be displayed, rendered, or otherwise provided to the user 112 via the user interaction subsystem 102. In some implementations, for example, the prompt displayer 142 may format the text message 136 to be displayed as the prompt 144 within a program or app that is used to implement configuration profiles 120 on user configurable device 106. Such a program or app may provide a structured and formatted display, such as, for example, an HTML form display, that may be used to interact with the user 112, such as by displaying one or more prompts 144. The prompt 144 may be used to identify on the display 110 a candidate configuration parameter 146 that may be changed. In some implementations, the prompt 144 may provide a candidate configuration parameter value 148 that may be changed. In some implementations, the prompt 144 may include a YES/NO choice for the user 112 to make in order to implement the candidate configuration parameter 146 and/or candidate configuration parameter value 148. A choice to change the configuration parameter and/or configuration parameter value 148 by the user may result in an instruction 150 being transmitted via the network 105 to the user configurable device 106 to implement such a requested change. In some implementations, the choice by the user 112 of either YES or NO to the prompt 144 may be transmitted back to the configuration-analysis subsystem 104 via the network 105 as a feedback message 152, which provides an indication 153 of the response by the user 112 (e.g., an indication of the YES or the NO response). The indication 153 of the response by the user 112 contained within the feedback message 152 may be used by the classifier 126 and/or the machine-learning module 130 to modify the relative weights and/or probabilities for determining future candidate configuration profiles for the user 112.

Figure 1B:
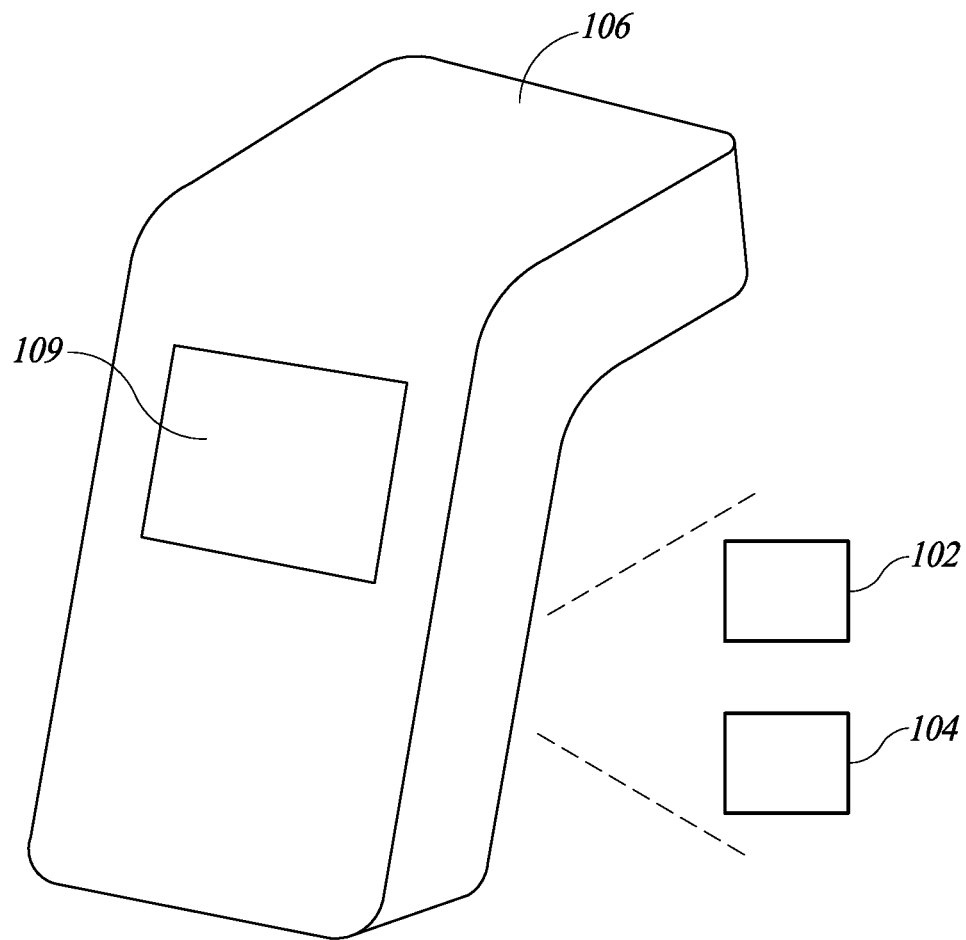
FIG. 1B is a schematic diagram that shows a configuration system in which a user configurable device includes a user interaction subsystem and a configuration-analysis subsystem, according to at least one illustrated implementation.
Figure 1C:
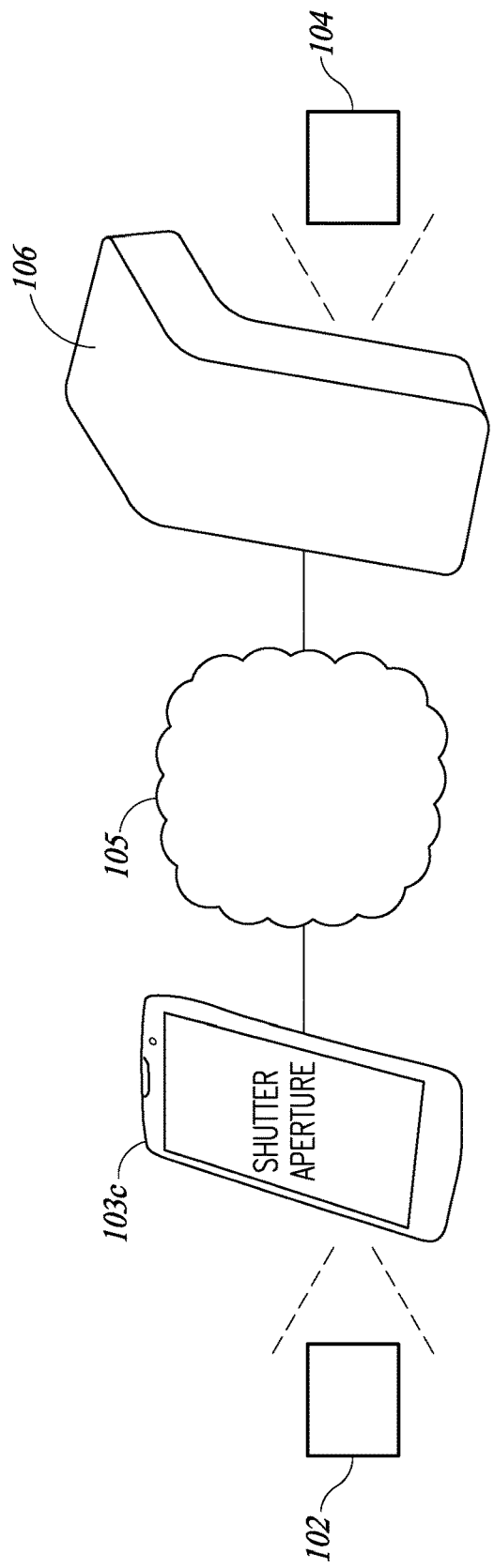
FIG. 1C is a schematic diagram that shows a configuration system in which a user configurable device includes a configuration-analysis subsystem and is communicatively coupled to a device that implements a user interaction subsystem, according to at least one illustrated implementation.
Figure 1D:
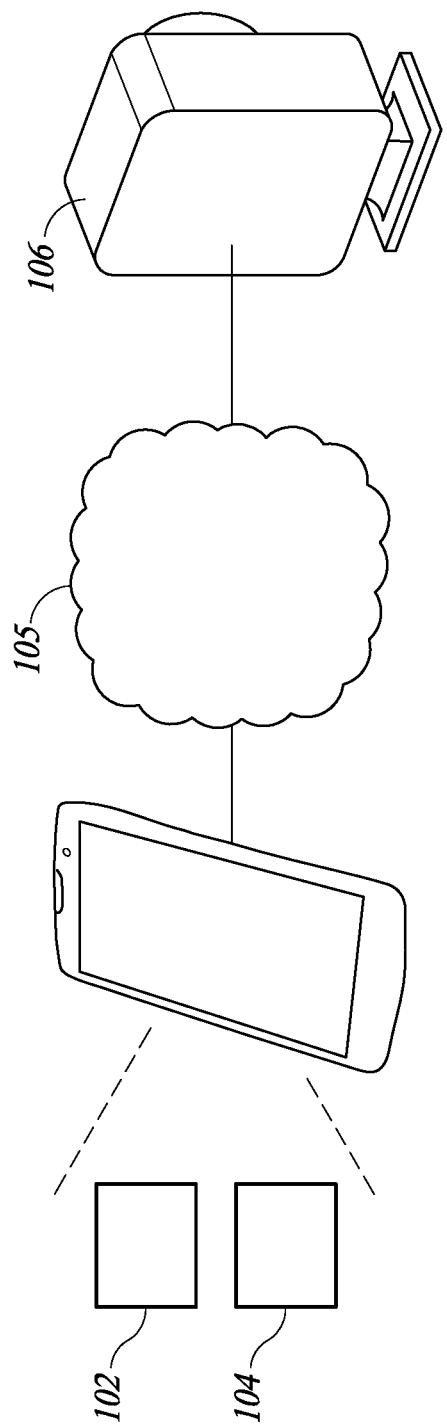
FIG. 1D is a schematic diagram that shows a configuration system in which a configuration-analysis subsystem and a user interaction subsystem are implemented on the same device, which is communicatively coupled to a user configurable device, according to at least one illustrated implementation.
Figure 1E:
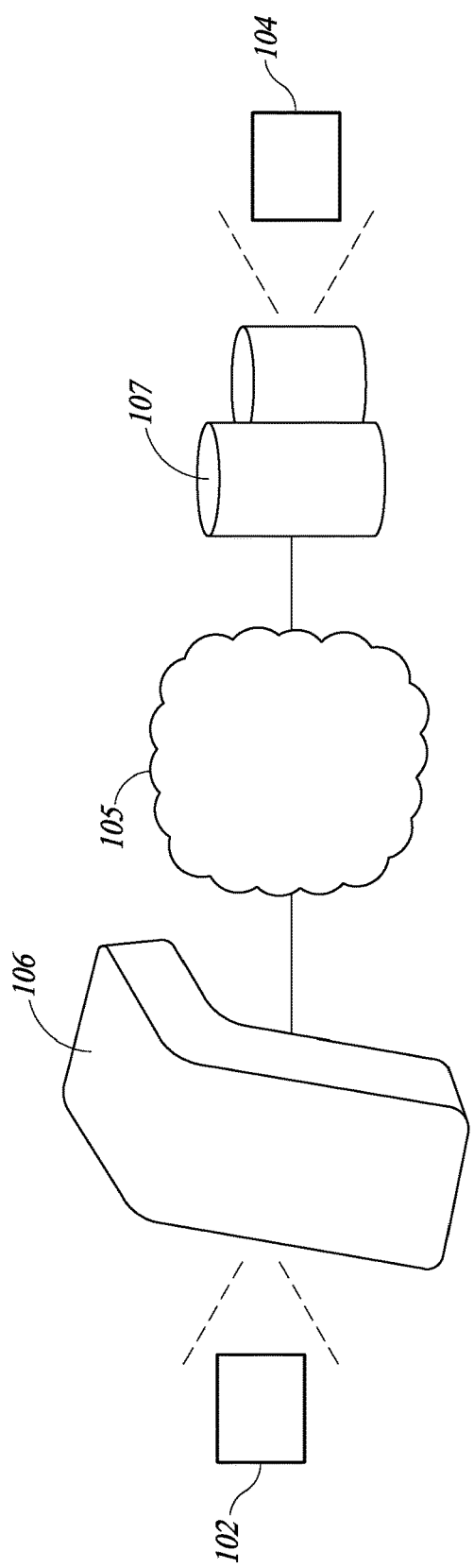
FIG. 1E is a schematic diagram that shows a configuration system in which a user configurable device includes a user interaction subsystem and is communicatively coupled with a device that implements a configuration-analysis subsystem, according to at least one illustrated implementation.

FIGS. 1B-1E show different implementations of the configuration system 100. In some implementations, two or more of the user interaction subsystem 102, the configuration-analysis subsystem 104, and the user configurable device 106 may be implemented by a single device or component. For example, as shown in FIG. 1B, the end user device 106a may include the user interaction subsystem 102 and the configuration-analysis subsystem 104. In some implementations, the configuration-analysis subsystem 104 may be part of the user configurable device 106, as shown in FIG. 1C. In such an implementation, the user interaction subsystem 102 may be included as part of another processor-enabled device 103, such as the mobile device 103c, which may be communicatively coupled to the user configurable device 106 via the network 105. As shown in FIG. 1D, in some implementations, the configuration-analysis subsystem 104 may be part of the processor-enabled device 103, such as the mobile device 103c, that implements the user interaction subsystem 102. The processor-enabled device 103 may be communicatively coupled with the user configurable device 106 via the network 105. In some implementations, the user configurable device 106 may include the user interaction subsystem 102, as shown in FIG. 1E. In such an implementation, the user configurable device 106 may be communicatively coupled with the processor-enabled device 107 that implements the configuration-analysis subsystem 104.

Figure 2:
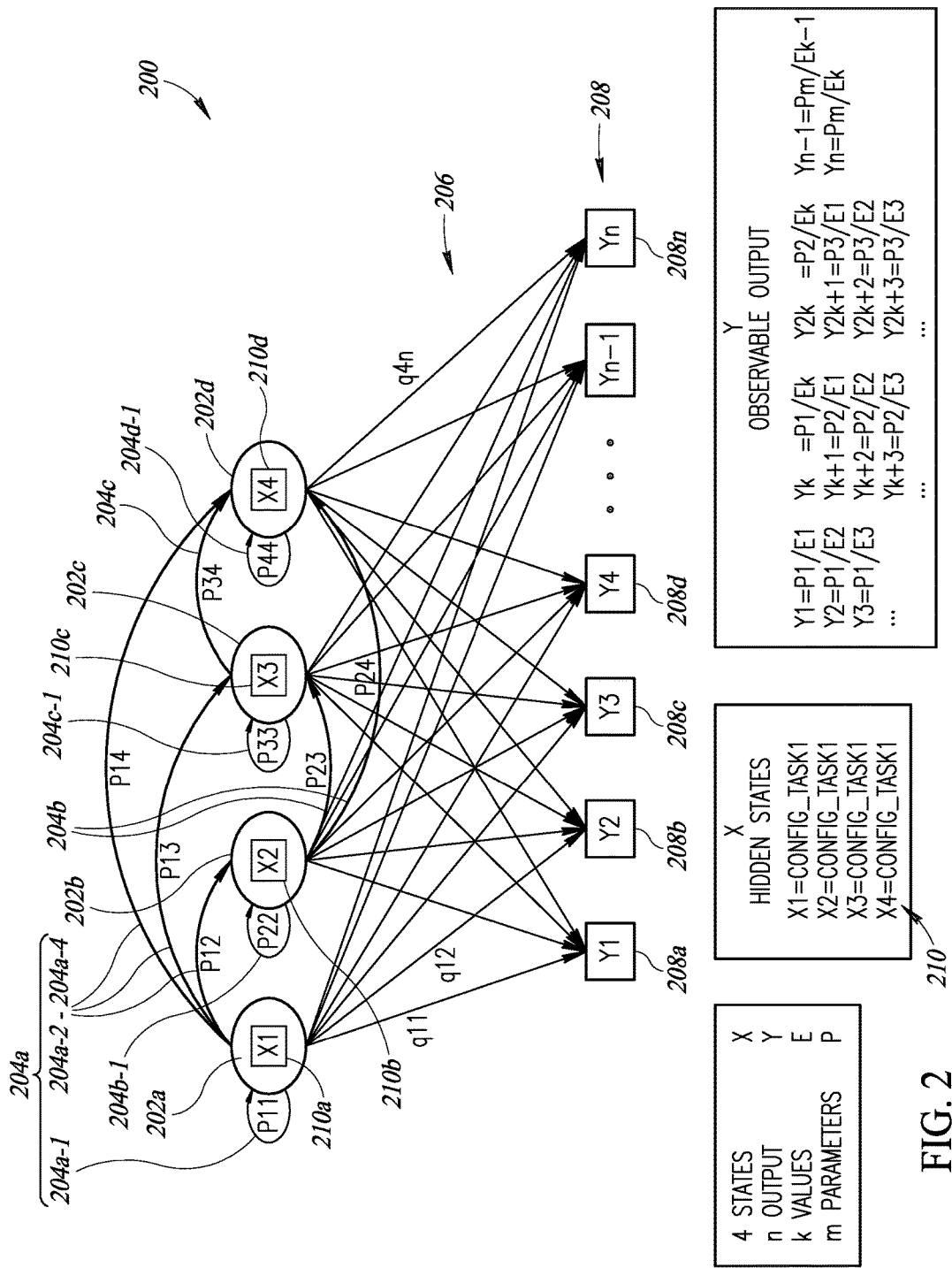
FIG. 2 is a schematic diagram that shows a Hidden Markov Model that may be used to determine a candidate configuration profile based on a current set of events, according to at least one illustrated implementation.

FIG. 2 shows a representation of a Hidden Markov Model 200 that may be used by the machine-learning module 130 to determine a candidate configuration profile based upon the current event 119, set of events 119, and/or configuration profile 120 received via the user interface 110. The Hidden Markov Model 200 may include a set of hidden states 202a-202d (collectively, "hidden states 202"), one or more sets of transition probabilities 204a-1-204d-1 (collectively, "transition probabilities 204") among the hidden states 202, a set of emission probabilities 206, and a set of observable outputs 208 related to the hidden states 202 via the emission probabilities 206.

Each of the hidden states 202 may correspond to a different configuration profile (collectively, "configuration profiles 210") for performing a task on a user configurable device 106. As such, for example, a first configuration profile X1 210a associated with a first hidden state 202a may include one or more different configuration parameters and/or configuration parameter values than those included as part of a second configuration profile X2 210b associated with a second hidden state 202b. The first configuration profile X1 210a and the second configuration profile X2 210b (as well as a third configuration profile X3 210c and a fourth configuration profile X4 210d) may be used to perform the same task on the user configurable device 106.

Each hidden state (e.g., first hidden state 202a) may have a set a of associated transition probabilities 204 that defines a transition probability from that hidden state to one of the hidden states 202a-202d within the set of hidden states 202. As such, the first hidden state 202a may have an associated set of first transition probabilities 204a that defines: a first transition probability 204a-1 that the first hidden state 202a will remain in the first hidden state 202a (i.e., that the first hidden state 202a will transition to the first hidden state 202a); a second transition probability 204a-2 that the first hidden state 202a will transition to the second hidden state 202b; a third transition probability 204a-3 that the first hidden state 202a will transition to a third hidden state 202c; and a fourth transition probability 204a-4 that the first hidden state 202a will transition to the fourth hidden state 202d. The second hidden state 202b includes a first transition probability 204b-1 that the second hidden state 202b will remain in the second hidden state 202b, as well as a set of transition probabilities 204b that the second hidden state 202b will transition to the third hidden state 202c or the fourth hidden state 202d. The third hidden state 202c includes a first transition probability 204c-1 that the third hidden state 202c will remain in the third hidden state 202c, as well as a set of one transition probability 204c that the third hidden state 202b will transition to the fourth hidden state 202d. The fourth hidden state 202d includes a first transition probability 204d-1 that the fourth hidden state 202d will remain in the fourth hidden state 202d. In some implementations, the transition probability 204 between one or more hidden states 202 may be zero (0%), indicating that no transition is possible between the two hidden states 202. The sum of the transition probabilities within the set of transition probabilities 204a for the first hidden state 202a may be equal to 1 (e.g., 100%).

In some implementations, the transition probabilities 204 may represent the likelihood or probability that the user 112 entered a configuration profile 120 that corresponds to one hidden state 202, but actually intended to enter a configuration profile 120 that corresponds to a different one of the hidden states 202. Such may occur, for example, if the user 112 mistakenly sets a configuration parameter 116 with a wrong configuration parameter value 118. In this situation, an increased, or high (e.g., 65%, 75%, or higher), transition probability 204 may exist between the current hidden state 202 that includes the wrong configuration profile 120 and a candidate hidden state 202 that includes a candidate configuration profile 120 that may correspond to the intended or correct configuration profile 120 having the configuration parameters 116 and/or configuration parameter values 118 that the user intended to enter. The configuration system 100 may present one or more configuration parameters 116 and/or configuration parameter values 118 from the candidate configuration profile 120 to the user 112 to either accept or reject as replacements for the current configuration profile 120.

The observable outputs 208 may correspond to specific sets of configuration parameters 116 and associated configuration parameter values 118. Each possible different configuration parameter value 118 for a configuration parameter 116 may have a different observable output 208. For example, a first observable output 208a may correspond to a first configuration parameter 116 and a first configuration parameter value 118, and a second observable output 208b may correspond to the first configuration parameter 116 and a second configuration parameter output 118. A third observable output 208c may correspond to a third configuration parameter 116 and a third configuration parameter value 118, and a fourth observable output 208d may correspond to a fourth configuration parameter 116 and a fourth configuration parameter value 118. The Hidden Markov Model 200 may include up to "n" different observable outputs, from the first observable output 208a to an "n-th" observable output 208n. Each hidden state 202 may be related to one or more of the observable outputs 208 via one or more of the emissions probabilities 206. Each emission probability 206 between a state 202 and an observable output 208 provides the probability that the configuration profile 210 associated with the state 202 will result in the set of configuration parameter 116 and associated configuration parameter value 118 included within the observable output 208. In such an implementation, the sum of the emission probabilities 206 associated with each hidden state 202 may be equal to 1 (e.g., 100%). In some implementations, the sum of emission probabilities 206 associated with each observable output 208 may be equal to 1 (e.g., 100%). In some implementations, the sum of emission probabilities 206 between one hidden state 202 and the set of observable outputs 208 associated with a single configuration parameter 116 may be equal to 1 (e.g., 100%).

The Hidden Markov Model 200 may be used to determine the most likely state 202 and associated configuration profile 210 given a set of one or more observable outputs 208 that may include one or more sets of configuration parameters 116 and associated configuration parameter values 118. Such a determination may be made after the configuration system 100 has received a complete configuration profile 120 has been entered into the user interface 110 but before the configuration profile 120 has been implemented on the user configurable device 106. When the configuration system 100 determines that the most likely state results in a different configuration profile 120 than the configuration profile 120 that was entered, then the configuration system 100 may identify a candidate configuration profile 120 that corresponds to the most likely state 202 within the Hidden Markov Model 200. The configuration system 100 may profile one or more prompts 144 to the user 112 including candidate configuration parameters 146 and/or candidate configuration parameter values 148 that are associated with the candidate configuration profile 120. As such, the configuration system 100 may perform in an error detection and/or correction mode based upon the configuration profile 120 entered by the user 112. In some implementations, the configuration system 100 may provide a real-time or near real-time feedback to the user 112 as the user 112 enters configuration parameter values 118 into the user interface 110. As such, the configuration system 100 may determine likely configuration parameters 116 and/or configuration parameter values 118 to be entered by the user 112 based upon the configuration parameters 116 and/or configuration parameter values 118 that the user 112 has previously entered. In addition, the configuration system 100 may determine if the configuration parameters 116 and/or configuration parameter values 118 already entered by the user 112 correspond to one of the more likely hidden states 202. As such, the configuration system 100 may perform in a predictive mode, and/or in an error correction and/or detection mode. The most likely hidden state 202 may be determined using well-known methods, such as the Viterbi algorithm. Such an algorithm may be used to determine the most likely hidden state 202 (and associated configuration profile 210) based upon a completed configuration profile 120 received by the configuration system 100, the most likely sequence between the various hidden states 202 based upon the configuration parameters 116 and/or configuration parameter values 118 received by the configuration system 100, and/or the most likely hidden state 202 (and associated configuration profile 210) based upon a partial configuration profile 120 received by the configuration system 100.

In some implementations, one or more of the transition probabilities 204 and/or the emission probabilities 206 may be preconfigured and initially set during a training stage before the configuration system 100 is first used. In such a training stage, the initial values for the transition probabilities 204 and/or the emission probabilities 206 may be determined based upon one or more of prior experience in operating similar such user configurable devices 106, prior experience in operating similar such configuration systems 100, and/or analysis provided by skilled users and/or experts who have knowledge of operating such user configurable devices 106 and/or configuration systems 100. For example, an initial training data set may be obtained from data collections of settings and configurations for devices that are the same as or similar to the current user configurable device 106 that is to be configured. In some instances, for example, prior settings and configurations used by the same customer or operator for the same or similar devices as the user configurable device 106 that is currently being configured may be used to generate an initial training data set. In addition, the relative weightings of the prior settings and configurations may be modified to provide relatively greater weight to prior settings and configurations implemented on devices that are the same as the user configurable device 106 that is currently being configured and were used for the same task and in the same environment. Such weighted prior settings and configurations may be used to generate the initial training data set. In some implementations, the initial training data set may be generated based upon prior settings and configurations used for devices that are the same as or similar to the current user configurable device 106 as those same or similar devices were configured by other customers, or by other divisions, locations, or operations of the current customer.

The values provided for the transition probabilities 204 and/or the emission probabilities 206 may be updated during run-time as the configuration system 100 is used. As such, as the user 112 confirms or rejects candidate configuration parameters and/or candidate configuration parameter values, the configuration system 100 may correspondingly update transition probabilities 204 and/or emission probabilities 208 for the configuration system 100. For example, if a user 112 rejects a prompt 144 for a candidate configuration parameter and/or a candidate configuration parameter value from a candidate configuration profile 210, then the configuration system 100 may reduce the transition probability 204 between the current hidden state 202 and hidden state 202 associated with the candidate profile 210. In some implementations, the settings and configurations used for devices that are the same or similar to the user configurable device 106 may be used to generate a run-time training data set that may be used to update or modify the current data set (e.g., transition probabilities 204, emission probabilities 206) that are being used in the Hidden Markov Model 200. Such a run-time training data set may be generated based upon the usage by the user or customer of devices that are the same as, or similar to, the user configurable device 106. In such an implementation, the relative weightings of settings and configurations for the other devices may be modified. For example, the weightings for settings and configurations of devices that are the same as the user configurable device 106 that is to be configured, and is performing the same task in the same environment may be given relatively greater weight. In some implementations, the run-time training data set may be generated based upon settings and configurations implemented on devices that are similar to or the same as the user configurable device 106 that is to be configured, but that are being configured by different divisions, operations, or locations of the current customer or operator, or that are being configured by a different customer. Such initial and run-time training data sets may be used to implement supervised machine learning or semi-supervised machine learning for the configuration-analysis subsystem 104.

Figure 3:
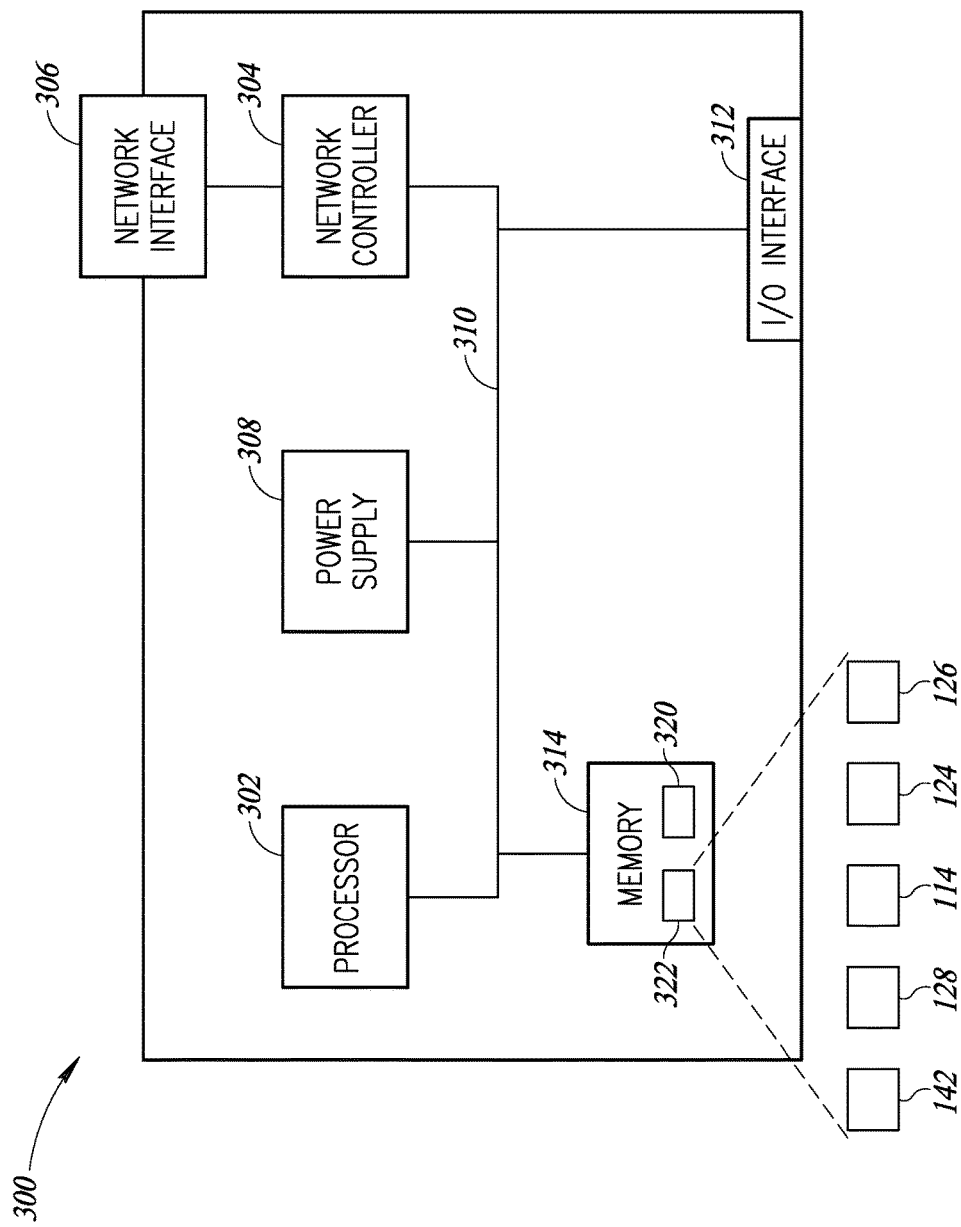
FIG. 3 is a block diagram of a processor-enabled device that may be used to implement one or more of a user interaction subsystem, a configuration-analysis subsystem, and a user configurable device, according to at least one illustrated implementation.

FIG. 3 shows a processor-enabled device 300, such as, for example, any one or more of the consumer device 102, the configuration-analysis subsystem 104, and/or the user configurable device 106. The processor-enabled device 300 includes one or more processors 302, a network controller 304 and associated network interface 306, a power supply 308, an input/output interface 312, and a system memory 314. Each of these components may be communicatively connected by bus(es) 310, which can provide bidirectional communication between the various components of the processor-enabled device 300. Bus(es) 310 may take, for example, the form of a plurality of buses (e.g., data buses, instruction buses, power buses) included in at least one body. The processor-enabled device 300 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80x86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The one or more processors 302 for the processor-enabled device 300 may be any logic processing unit, such as one or more central processing units (CPUs), digital signal processors (DSPs), application-specific integrated circuits (ASICs), field programmable gate arrays (FPGAs), etc. The power supply 308 for the processor-enabled device 300 may include one or more power supplies 308. The power supply 308 may be an internal power supply, such as a battery, energy source, fuel cell, or the like.

The processor-enabled device 300 may include a network controller 304 and associated network interface 306 to enable the processor-enabled device 300 to communicate with one or more communications or data networks. The network controller 304 may include one or more communications stacks to facilitate such network communication. Communications may be via the network interface 306 that includes a wired and/or a wireless network architecture to connect to, for instance, wired and wireless enterprise-wide computer networks, intranets, extranets, and/or the Internet. Other embodiments may include other types of communications networks including telecommunications networks, cellular networks, paging networks, and other mobile networks.

The processor-enabled device 300 may include an input/output interface 312. Such an input/output interface 312 may provide an electrical and/or communicative coupling between the processor-enabled device 300 and various other input and output components or devices. Such components, for example, may include navigation and/or location tracking equipment and applications, and may provide, for example, geo-location functionality (e.g., GPS and/or GLONASS capabilities) that determines coordinate information, and/or positional functionality that determines or estimates relative location (e.g., location relative to one or more cellular towers) that may be used to provide an absolute and/or a relative position of the processor-enabled device 300.

The processor-enabled device 300 may include a system memory 314 that may comprise a hard disk drive (HDD) for reading from and writing to a hard disk, an optical disk drive for reading from and writing to removable optical disks, a magnetic disk drive for reading from and writing to magnetic disks, and/or a solid-state drive (SSD). The optical disk can be a CD-ROM, while the magnetic disk can be a magnetic floppy disk or diskette. The hard disk drive, optical disk drive, and magnetic disk drive may communicate with the one or more processors 302 via the system bus 310. Those skilled in the relevant art will appreciate that other types of computer-readable media that can store data accessible by a computer may be employed, such as WORM drives, RAID drives, magnetic cassettes, flash memory cards, digital video disks ("DVD"), RAMs, ROMs, smart cards, etc.

System memory 314 can be used to store data 320 as well as one or more programs, applications, or routines 322. For example, the system memory 314 may store instructions for one or more of the event logger 114, the event parser 124, the classifier 126, the prompt engine 128, and/or the prompt displayer 142.

Figure 4:
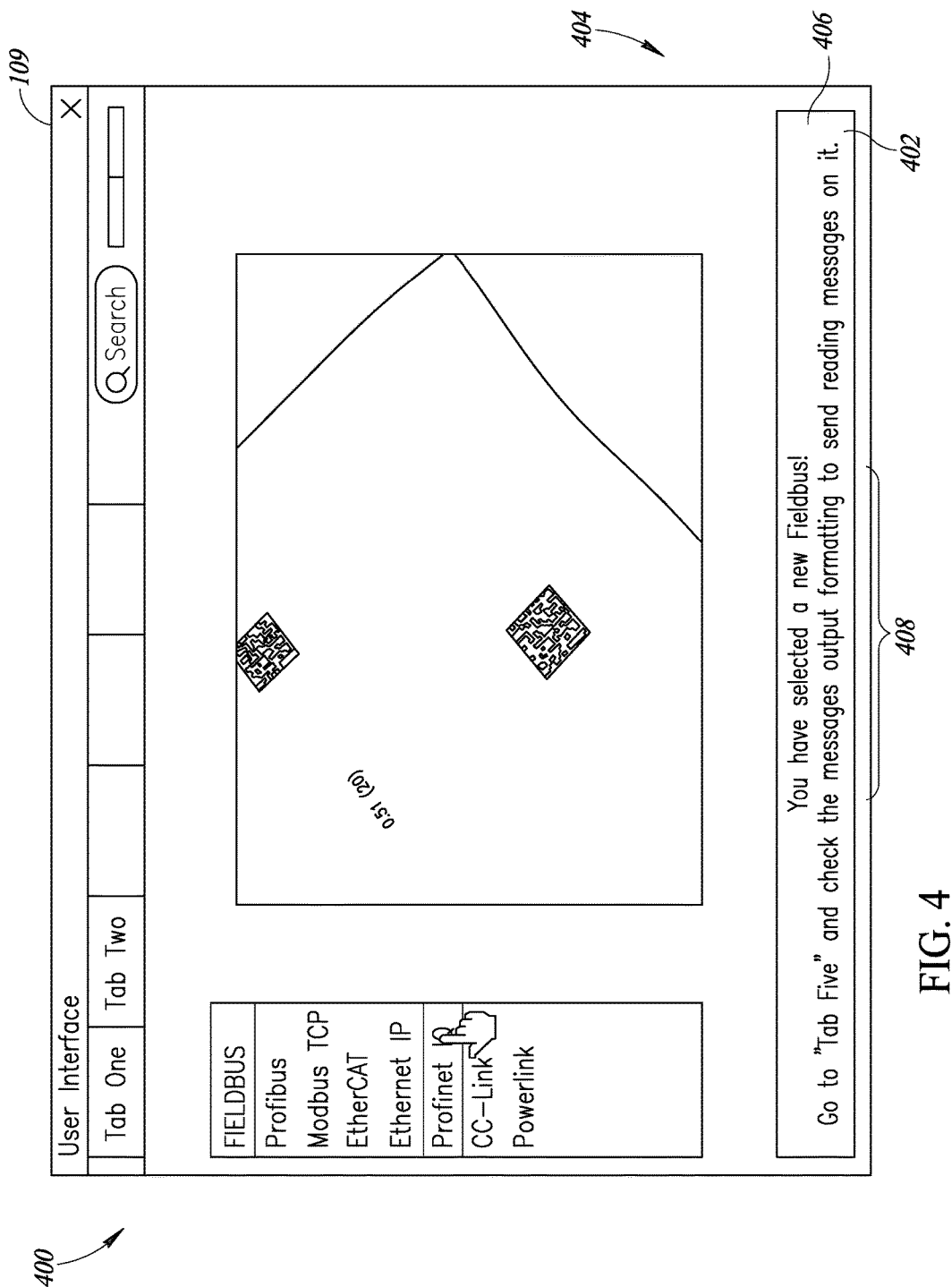
FIG. 4 is a schematic diagram of a portion of a graphical user interface illustrating a display of a prompt on a user interaction subsystem, according to at least one illustrated implementation.

FIG. 4 shows a graphical user interface 400 rendered on a display 109 at a user interaction subsystem 102 according to the display instructions 108 in which a prompt 402 is provided to enter configuration parameter values 118 for one or more configuration parameters 116 based upon previously entered configuration parameter values 118. Such a prompt 402 may be provided during a configuration process during which a user configurable device 106 is being configured to perform a task. The prompt 402 may be related to the prompt message 132 generated by the classifier 126 upon analyzing the previously entered configuration parameter values 118. In some implementations, the prompt 402 may display one or more of the text message 136 associated with the set of one or more prompt strings 134 generated and transmitted by the prompt engine 128.

The prompt 402 may be rendered at various positions and with various formatting within the display 109 to gain the notice and attention of the user 112, such as, for example, proximate a bottom portion 404 of the display 109 within a dialogue box 406. In some implementations, the prompt 402 may be provided within a dialogue box, a pop-up box, or some other similar such presentation within the display 109. As shown in FIG. 4, the prompt 402 may identify one or more candidate configuration parameters 408 (e.g., message output formatting for a selected Fieldbus) that may be set with configuration parameter values 118 in order to continue the configuration process. In some implementations, the prompt 402 may be positioned within the display 109 such to not interfere with subsequent interactions by the user 112 with the graphical user interface 400. As such, the user 112 may effectively ignore the prompt 402. In such an implementation, the configuration system 100 may modify the transition probabilities 204 and/or emission probabilities 206 based upon the lack of interaction by the user 112 with the prompt 402. In some implementations, the modifications of the transition probabilities 204 and/or emission probabilities 206 by the configuration system 100 may be different when the user 112 ignores a prompt 402 than when the user 112 actively rejects a prompt 402. For example, the configuration system 100 may reduce the transition probability 204 between two hidden states 202 by a certain amount when the user 112 ignores a prompt 402, and may reduce the transition probability 204 between the same two hidden states 202 by greater than the certain amount when the user 112 rejects the prompt 402.

Figure 5:
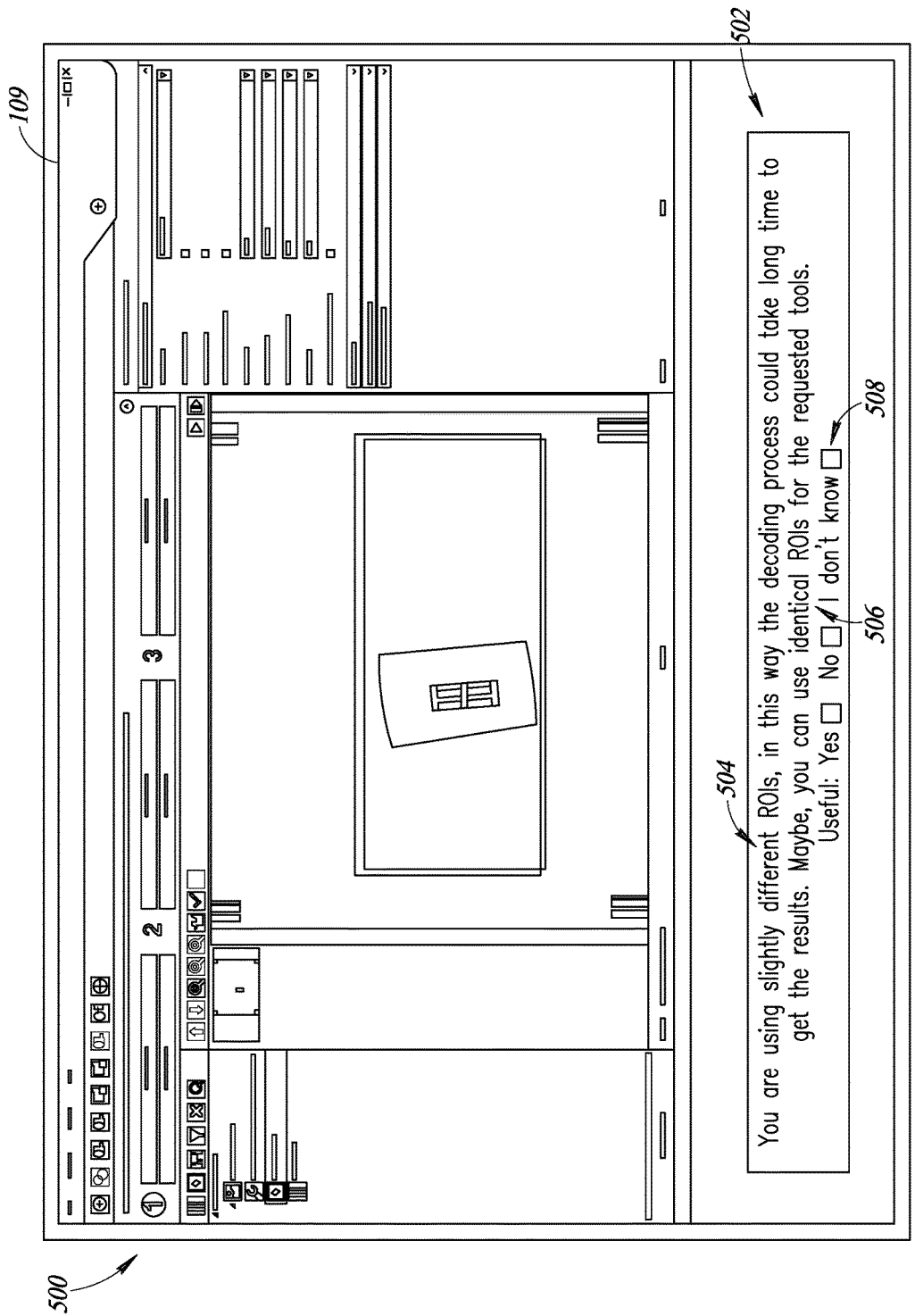
FIG. 5 is a schematic diagram of a portion of a graphical user interface illustrating a display of another prompt on a user interaction subsystem, according to at least one illustrated implementation.

FIG. 5 shows a graphical user interface 500 rendered on a display 109 at a user interaction subsystem 102 in which a prompt 502 is provided to provide notification of discrepancies in one or more configuration parameter values 504 based upon previously entered configuration parameter values 506. Such a prompt 502 may be provided during or at the end of a configuration process during which the user 112 is entering configuration parameter values 118 for a user configurable device 106 to perform a task. The prompt 502 may be used to notify the user 112 of when the entered configuration parameter values 118 may result in an unwanted configuration profile 120. In some implementations, the prompt 502 may be provided after the user 112 has entered one or more configuration parameter values 118 into the graphical user interface 500 and before the configuration parameter values 118 have been implemented on the user configurable device 106. In some implementations, the prompt 502 may provide one or more feedback fields 508 to elicit feedback from the user 112. The configuration system 100 may use the feedback provided via the feedback fields 508 to modify one or more of the transition probabilities 204 and/or the emission probabilities 206. Such modifications of the transition probabilities 204 and/or the emission probabilities 206 may be based on one or more of the feedback provided via the feedback field 508 and commands received via the graphical user interface 500 to modify one or more configuration parameters 116 and/or configuration parameter values 118.

Figure 6:
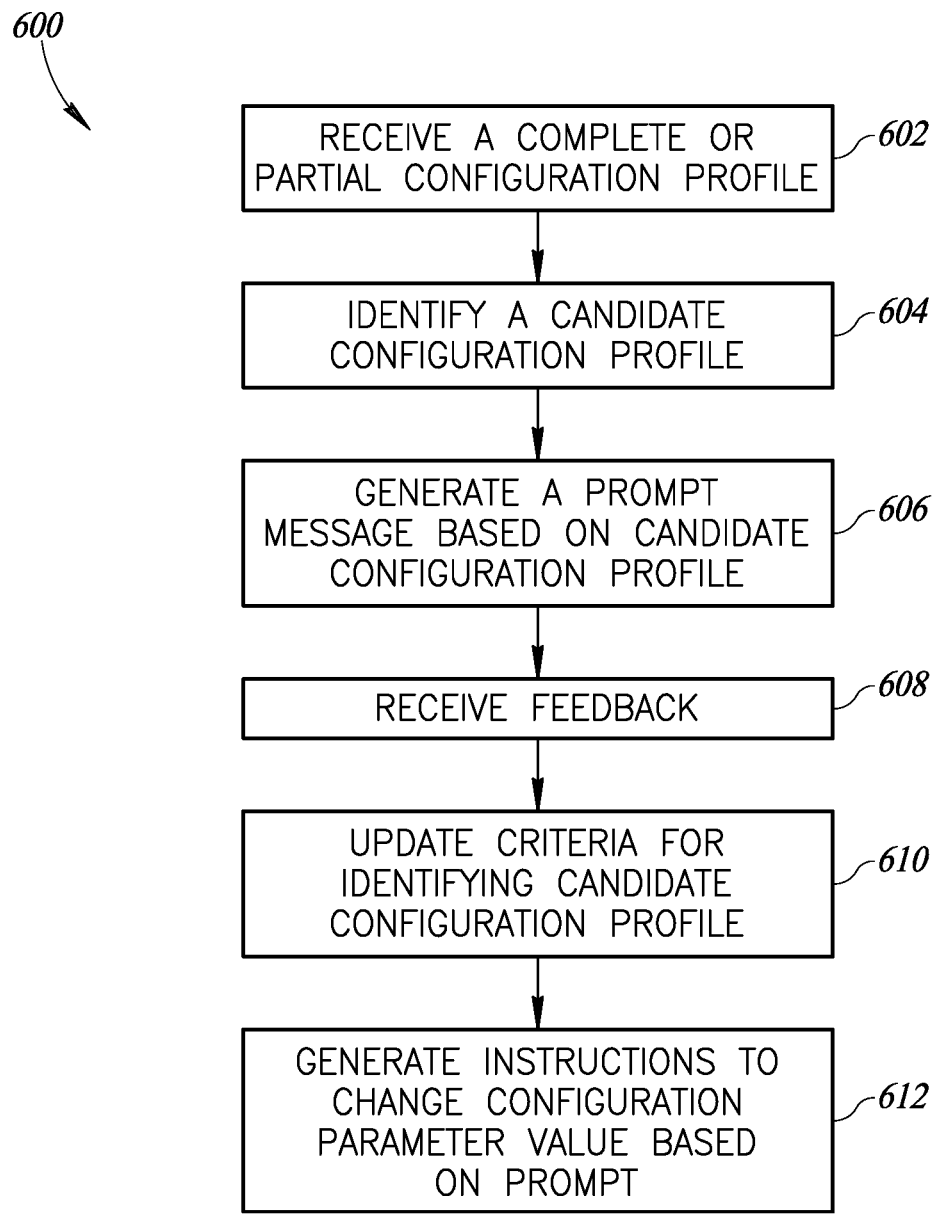
FIG. 6 is a flow diagram showing a method of generating one or more prompts that may be used to modify one or more configuration parameters and/or configuration parameter values on a user configurable device, according to at least one illustrated implementation.

FIG. 6 shows a method 600 to generate one or more prompts 144 that may be used to modify one or more configuration parameters 116 and/or configuration parameter values 118 on a user configurable device 106.

At 602, one or more processors 302 receive a configuration profile 120. Such a configuration profile 120 may be partial or complete, and may be received via a user interface 110. The configuration profile 120 may contain one or more configuration parameters 116 for a task to be performed by a user configurable device 106, such as, for example, to perform a specified function and/or to engage a specified setting. In some implementations, the one or more processors 302 may be located at one or more of the user interaction subsystem 102, the user configurable device 106, and/or the configuration-analysis subsystem 104.

At 604, the one or more processors 302 identify a candidate configuration profile based upon the configuration profile 120 received at 602. Such identification of the candidate configuration profile may be performed, for example, by implementing the Hidden Markov Model 200, which may analyze the configuration parameters 116 and associated configuration parameter values 118 contained within the received configuration profile 120. In such an implementation, the Hidden Markov Model 200 may be used to identify a current hidden state 202 (or set of current hidden states 202) that corresponds to a current configuration profile 210 based upon the entered and received configuration parameters 116 and associated configuration parameter values 118 from 602. After identifying the current hidden state 202 (or set of current hidden states 202), the Hidden Markov Model 200 may identify a candidate hidden state 202 or set of candidate hidden states 202 that may correspond to a configuration profile 210 that the user may have intended to enter. After identifying the candidate hidden state 202 (or set of candidate hidden states 202), the Hidden Markov Model 200 may be used to identify a candidate configuration profile 120 and associated sets of candidate configuration parameters 116 and candidate configuration parameter values 118. The one or more processors 302 that are used to identify the candidate configuration profile may be located, for example, at one or more of the user interaction subsystem 102, the user configurable device 106, and/or the configuration-analysis subsystem 104.

At 606, the one or more processors 302 may generate one or more prompt messages 132 containing information related to the candidate configuration profile 120. For example, in some implementations, the processors 302 implementing the Hidden Markov Model 200 may use the candidate configuration profile 120 to generate one or more prompt messages 132 that include information related to implementing the candidate configuration profile 210 on the user configurable device 106. The prompt messages 132 may result in one or more prompts 144 being generated and rendered on the user interaction subsystem 102. The prompts 144 may provide the user 112 with the ability to change the one or more configuration parameters 116 and/or configuration parameter values 118 on the current configuration profile 120 to result in the candidate configuration profile. In some implementations, the user 112 may reject the changes in the one or more prompts 144 such that the configuration profile 120 remains unchanged. One or more of the prompt string 134 and/or the prompt message 132 may be transmitted via the network 105.

At 608, the one or more processors 302 receive feedback message 152 that contains the indication 153 of the response regarding the prompt 144 rendered on the display 109 at the user interaction subsystem 102. The feedback message 152 may be received, for example, at one or more of the user interaction subsystem 102, the user configurable device 106, and/or the configuration-analysis subsystem 104. In some implementations, the feedback message 152 may show that the user 112 chose to implement one or more of the changes included within the prompt 144 in order to implement the candidate configuration profile 120. In some implementations, the indication 153 of the response in the feedback message 152 may show that the user 112 chose to reject one or more of the changes associated with the candidate configuration profile 120. The feedback message 152 may be transmitted via the communication network 105.

At 610, the one or more processors 302 update the criteria for identifying the candidate configuration profiles 120 used at 604. The one or more processors 302 may be located, for example, at one or more of the user interaction subsystem 102, the user configurable device 106, and/or the device used to implement the configuration-analysis subsystem 104. In such implementations in which a Hidden Markov Module 200 is used to identify a candidate configuration profile 120, one or more of the transition probabilities 204 and/or the emission probabilities 206 may be modified based upon the feedback received at 608. As such, for example, when the user 112 elects to change a configuration parameter 116 based upon a prompt 144 associated with the prompt message 132 generated at 606, then the one or more processors 302 may increase the transition probability 204 between the hidden state 202 associated with the previous configuration profile 210 and the hidden state 202 associated with the candidate configuration profile 210. When the user 112 instead elects to reject a change suggested by a prompt 144 associated with the prompt message 132 generated at 606, then the one or more processors 302 may decrease the transition probability 204 between the hidden state 202 associated with the previous configuration profile 210 and the hidden state 202 associated with the candidate configuration profile 210.

At 612, the one or more processors 302 may generate instructions 150 that result in the configuration parameter 116 and/or the configuration parameter value 118 being changed at the user configurable device 106. The one or more processors 302 may be located, for example, at one or more of the user interaction subsystem 102, the user configurable device 106, and/or the device used to implement the configuration-analysis subsystem 104. In some implementations, the instructions 150 may be generated as a result of the interactions by the user 112 in responding to the prompt 144 rendered on the display 109 at the user interaction subsystem 102. The changes in the configuration profile 120 resulting from the instructions 150 may be based on the candidate configuration profile 120 generated at 604.

Figure 7:
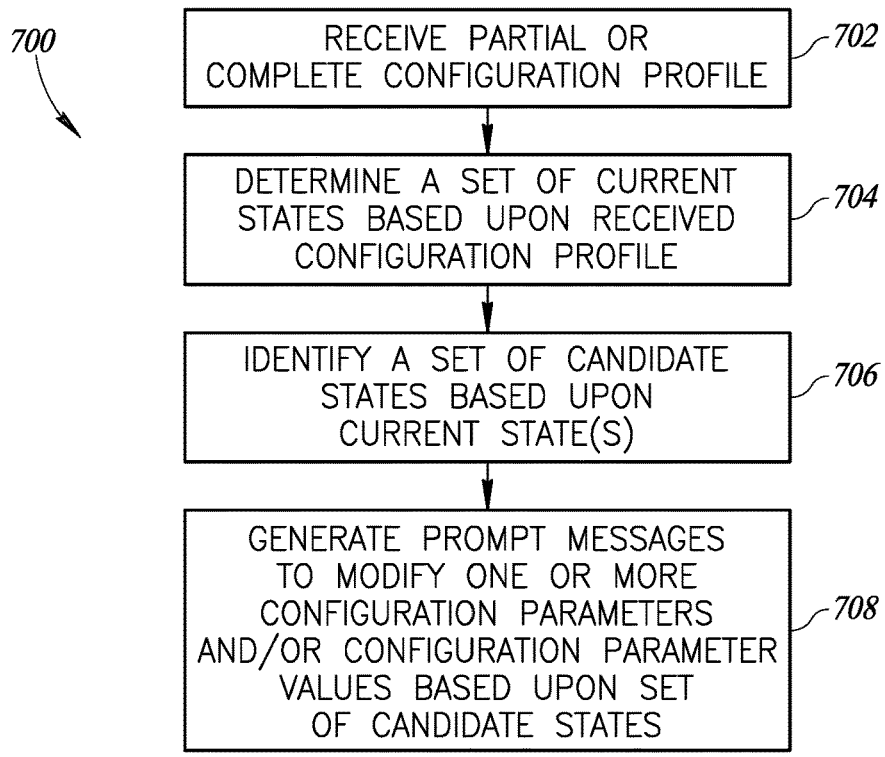
FIG. 7 is a flow diagram showing a method of identifying a candidate configuration profile based upon current configuration parameters and associated configuration parameter values, according to at least one illustrated implementation.

FIG. 7 shows a method 700 to be implemented by the classifier 126 to identify a candidate configuration profile 120 based upon the current configuration parameters 116 and associated configuration parameter values 118. The method 700 may result in one or more prompt messages 132 being generated. In some implementations, some or all of the method 700 may be implemented as part of 604 and/or 606 in method 600.

At 702, one or more processors 302 may receive a configuration profile 120 associated with a task to be performed by a user configurable device 106. Such a configuration profile 120 may be partial or complete, and may be received via a user interface 110. The configuration profile 120 may contain one or more configuration parameters 116 for a task to be performed by a user configurable device 106, such as, for example, to perform a specified function and/or to engage a specified setting. The one or more processors 302 may be located, for example, on one or more of the user interaction subsystem 102, the user configurable device 106, and/or the configuration-analysis subsystem 104.

At 704, the one or more processors 302 determine a set of current hidden states 202, such as the hidden states 202 associated with the Hidden Markov Model 200. The one or more processors 302 may be located, for example, on one or more of the user interaction subsystem 102, the user configurable device 106, and/or the configuration-analysis subsystem 104. In some implementations, the set of current hidden states 202 may be determined based upon the current configuration parameters 116 and associated configuration parameter values 118 included within the configuration profile 120 received at 702. In some implementations, each set of a configuration parameter 116 and associated configuration parameter value 118 may form an observable output 208 within the Hidden Markov Model 200, in which the hidden states 202 are associated with the observable outputs 208 via a set of emission probabilities 206. In such an implementation, the emission probabilities 206 between a hidden state 202 and an observable output 208 may provide a probability that the configuration profile 210 associated with the hidden state 202 will have the set of the configuration parameter 116 and associated configuration parameter value 118 associated with the observable output 208. As such, in some implementations, the set of hidden states 202 may be determined from the sets of configuration parameters 116 and associated configuration parameter values 118 contained within the received configuration profile 120 using the set of emission probabilities 206 using, for example, a forward-backward, expectation maximization determination (e.g., using Baum-Welch algorithm to determine the current hidden state 202 and/or set of current hidden states 202). In such an implementation, the sum of the emission probabilities 206 associated with each hidden state 202 may be equal to 1 (e.g., 100%). In some implementations, the sum of emission probabilities 206 associated with each observable output 208 may be equal to 1 (e.g., 100%). In some implementations, the sum of emission probabilities 206 between one hidden state 202 and the set of observable outputs 208 associated with a single configuration parameter 116 may be equal to 1 (e.g., 100%).

In some implementations, the emission probabilities 206 are preconfigured values that may be set during a training stage during which the emission probabilities may be set based upon one or more of prior experience in operating similar such user configurable devices 106, prior experience in operating similar such configuration systems 100, and/or analysis provided by skilled users and/or experts who have knowledge of operating such user configurable devices 106 and/or configuration systems 100. In some implementations, the emission probabilities 206 may be modifiable based upon feedback messages 152 received from the user 112 that contain indications 153 of responses by the user 112 to prior prompts 144 to modify or change configuration parameters 116 and/or configuration parameter values 118 on the user configurable device 106. As such, the configuration system 100 may be customizable based upon the previous actions by the user 112. In some implementations, the emission probabilities 206 may be modifiable based upon actions by other users in configuring devices that are the same as or related to the user configurable device 106 being configured by the user 112.

At 706, the one or more processors 302 identify a set of candidate hidden states 202 based upon the set of current hidden states 202. The one or more processors 302 may be located, for example, on one or more of the user interaction subsystem 102, the user configurable device 106, and/or the configuration-analysis subsystem 104. In some implementations, the set of hidden states 202 within the Hidden Markov Model 200 may be related based upon one or more transition probabilities 204, each of which may provide a transition probability from a first hidden state 202 to a second hidden state 202. In such an implementation, each hidden state 202 may be associated with a set of transition probabilities 206 that provide the probabilities for transitioning from that hidden state 202 to the hidden states 202 in the set of hidden states 202. The set of transition probabilities 206 may include a transition probability that the hidden state will remain in the current hidden state 202. In such an implementation, the sum of each transition probability 206 in the set of transition probabilities 206 for each hidden state 202 may be 1 (e.g., 100%). In some implementations, at least some of the transition probabilities 206 within the set of transition probabilities 206 between a current hidden state 202 and another hidden state 202 may be zero (0%), indicating that no possibilities of transitioning between the current hidden state 202 and the other hidden state 202. The set of candidate hidden states 202 may be used to identify a candidate configuration profile 210 based upon, for example, a most-likely-explanation determination (e.g., using a Viterbi algorithm to identify the candidate configuration profile 210).

In some implementations, the transition probabilities 204 may represent the likelihood or probability that the user 112 entered a configuration profile 120 that corresponds to one hidden state 202, but actually intended to enter a configuration profile 120 that corresponds to a different one of the hidden states 202. Such may occur, for example, if the user 112 mistakenly sets a configuration parameter 116 with a wrong configuration parameter value 118. In this situation, an increased, or high (e.g., 65%, 75%, or higher), transition probability 204 may exist between the current hidden state 202 that includes the wrong configuration profile 120 and a candidate hidden state 202 that includes a candidate configuration profile 120 that may correspond to the intended or correct configuration profile 120 having the configuration parameters 116 and/or configuration parameter values 118 that the user intended to enter. The configuration system 100 may present one or more configuration parameters 116 and/or configuration parameter values 118 from the candidate configuration profile 120 to the user 112 to either accept or reject as replacements for the current configuration profile 120.

At 708, the one or more processors 302 generate one or more prompt messages 132 that may provide information indicating a change or modification to make to one or more configuration parameters 116 and/or configuration parameter values 118 based upon the identification at 706 of the set of candidate states 202. The prompt messages 132 may result in one or more prompts 144 being generated and rendered on the display 109 user interaction subsystem 102. In some implementations, for example, the prompt message 132 may result in the prompt engine 128 generating and transmitting one or more prompt strings 134 to be transmitted via the network 105 to the user interaction subsystem 102. The prompts 144 may provide the user 112 with the ability to change the one or more configuration parameters 116 and/or configuration parameter values 118 on the current configuration profile 120 based on the candidate configuration profile. In some implementations, the user 112 may reject the changes in the one or more prompts 144 such that the configuration profile 120 remains unchanged. One or more of the prompt string 134 and/or the prompt message 132 may be transmitted via the network 105.

Figure 8:
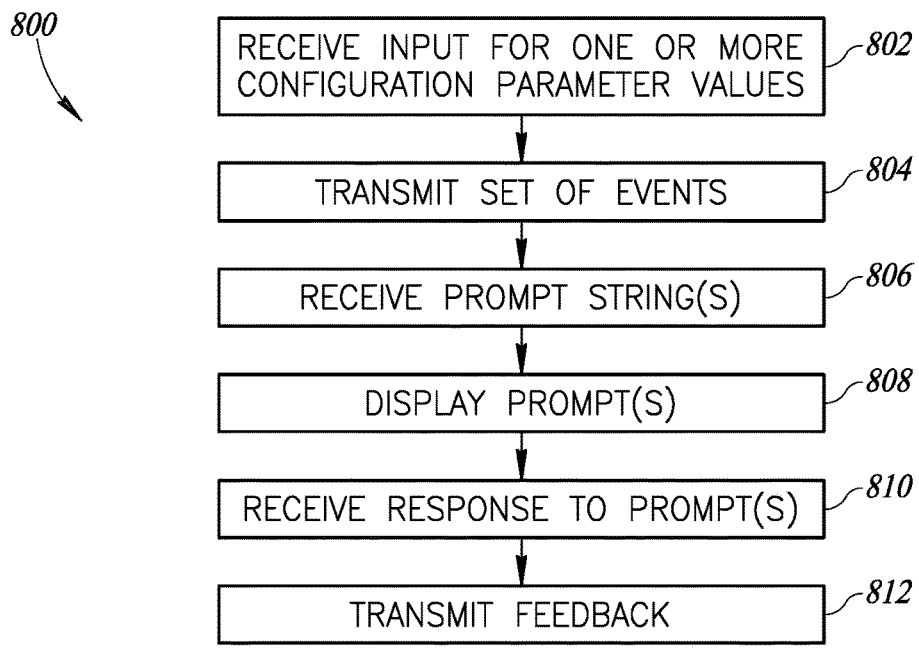
FIG. 8 is a flow diagram showing a method of receiving events entered via a user interface and providing one or more prompts via the user interface to update and/or modify one or more configuration parameters and/or configuration parameter values on a user configurable device, according to at least one illustrated implementation.

FIG. 8 shows a method 800 to receive events 119 entered via a user interface 110 and to provide one or more prompts 144 via the user interface 110 to update and/or modify one or more configuration parameters 116 and/or configuration parameter values 118 on a user configurable device 106.

At 802, the user interaction subsystem 102 receives configuration parameter values 118 for one or more configuration parameters 116. Such configuration parameters 116 and associated configuration parameter values 118 may comprise a set of events 119. The user interaction subsystem 102 may collect the set of events 119 from a user interface 110 that has been rendered on the display 109 of the processor-enabled device 103. The user interface 110 may be a graphical user interface with one or more fields for entering configuration parameter values 118 for one or more configuration parameters 116. In some implementations, the graphical user interface may use one or more structured forms that may include such one or more fields.

At 804, the user interaction subsystem 102 may transmit the set of events 119, for example, to the configuration-analysis subsystem 104. In some implementations, the configuration-analysis subsystem 104 may form part of the user interaction subsystem 102. In some implementations, the user interaction subsystem 102 may transmit the set of events 119 via the network 105 via one or more messages. Such events 119 may form a complete and/or a partial configuration profile 120 associated with a user configurable device 106.

At 806, the user interaction subsystem 102 receives one or more messages from the configuration-analysis subsystem 104 that include one or more prompt strings 134. In some implementations, a unique identification value 138 may be associated with each prompt string 134 and/or set of prompt strings 134 that are received by the user interaction subsystem 102. In some implementations, each prompt string 134 may have an associated sequence number 140 with the sequence numbers 140 comprising an ordered set of sequence numbers 140 that may be used to determine or set an order for presenting the prompts associated with the prompt strings 134 to the user 112. Such order may be based upon, for example, a relative importance of the prompts, a sequential order in which the changes suggested by the prompts may need to be entered, or some other such order.

At 808, the user interaction subsystem 102 renders the prompts 144 on the display 109 of the processor-enabled device 103 that implements the user interaction subsystem 102. The prompts 144 may be rendered as part of the user interface 110. The prompt 144 may be rendered at various positions and with various formatting within the display 109 to gain the notice and attention of the user 112. In some implementations, the prompt 144 may be provided within a dialogue box, a pop-up box, or some other similar such presentation within the display 109. In some implementations, the prompt 144 may be positioned within the display 109 such to not interfere with subsequent interactions by the user 112 with the user interface 110. As such, the user 112 may effectively ignore the prompt 144.

At 810, the user interaction subsystem 102 receives a response to the prompt 144. Such a response may provide confirmation that the candidate configuration parameter and/or candidate configuration parameter value be used on the user configurable device 106. Such a response may result in the instruction 150 being transmitted to the user configurable device 106 from the user interaction subsystem 102 and/or the configuration-analysis subsystem 104 via the network 105. In some implementations, the response may provide a rejection of the candidate configuration parameter and/or candidate configuration parameter value. In some implementations, such a response may be provided within a field provided within a portion of the prompt 144.

At 812, the user interaction subsystem 102 transmits feedback 152 containing an indication 153 of the response to the configuration-analysis subsystem 104. In some implementations, such feedback 152 may be transmitted via the network 105. The indication 153 of the response may be used to update the machine-learning module 130 of the configuration-analysis subsystem 104. In implementations involving the Hidden Markov Model 200, for example, such updates may involve one or more of the transition probabilities 204 and/or the emission probabilities 206.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to assess configuration profiles for a user configurable device, the configuration profiles each comprising at least one set of a configuration parameter and an associated configuration parameter value, the system comprising:
   at least one processor;
   at least one nontransitory processor-readable storage device communicatively coupled to the at least one processor and which stores processor-executable instructions which, when executed by the at least one processor, cause the at least one processor to:
   receive at least one configuration parameter value;
   determine a set of current states based at least in part on the received at least one configuration parameter value, each state of the set of current states which represents a possible configuration profile of the user configurable device;
   identify a candidate state based at least in part on the determined set of current states, the candidate state which is related to a candidate configuration profile, the candidate configuration profile which includes at least one set of a candidate configuration parameter and an associated candidate configuration parameter value that is different from the received at least one configuration parameter value;
   cause to be presented via a user interface a prompt to set at least one candidate configuration parameter based at least in part on the corresponding candidate configuration parameter value in the candidate configuration profile;
   receive via the user interface an indication of a response to the prompt to set the at least one configuration parameter; and
   generate an instruction that causes the at least one configuration parameter to be set according to the received indication of the response.

2. The system of claim 1 wherein the processor executable instructions when executed further cause the at least one processor to:
   determine the current states in the set of current states based upon a set of emission probabilities that relate the received at least one configuration parameter value to each current state in the set of current states.

3. The system of claim 2 wherein the processor executable instructions when executed further cause the at least one processor to:
   update at least one of the emission probabilities for at least one of the current states in the set of current states based at least in part upon the received indication of the response.

4. The system of claim 1 wherein the processor executable instructions when executed further cause the at least one processor to:
   determine the candidate state based at least in part upon a transition probability that relates at least one of the current states in the set of current states to the candidate state.

5. The system of claim 4 wherein the processor executable instructions when executed further cause the at least one processor to:
   update at least one of the transition probabilities for at least one of the current states in the set of current states based at least in part upon the received indication of the response.

6. The system of claim 4 wherein at least one transition probability for at least one current state in the set of current states relates to remaining in the at least one current state.

7. The system of claim 4 wherein the processor executable instructions when executed further cause the at least one processor to:
   determine a set of candidate states, wherein each candidate state within the set of candidate states is related to at least one of the current states in the set of current states by at least one transition probability.

8. The system of claim 7 wherein the processor executable instructions when executed further cause the at least one processor to:
   determine the transition probability for each candidate state within the set of candidate states, wherein the at least one candidate configuration parameter that is presented in the prompt via the user interface corresponds to a candidate configuration parameter included with a candidate configuration profile related to a candidate state within the set of candidate states that has the highest transition probability.

9. The system of claim 8 wherein the processor executable instructions when executed further cause the at least one processor to:
   update at least one transition probability for one or more candidate states within the set of candidate states based at least in part upon the received indication of the response.

10. The system of claim 7 wherein the set of candidate states includes at least one of the current states within the set of current states.

11. A method for determining a candidate configuration profile from a plurality of configuration profiles, each configuration profile comprising at least one set of a configuration parameter and an associated configuration parameter value, the method comprising:
    receiving by at least one processor at least one configuration parameter value;
    determining by the at least one processor a set of current states based at least in part on the received at least one configuration parameter value, each state of the set of current states representing a possible configuration profile of the user configurable device;
    determining by the at least one processor a candidate state based at least in part on the determined set of current states, the candidate state which is related to the candidate configuration profile comprising at least one set of a candidate configuration parameter and an associated candidate configuration parameter value that is different from the received at least one configuration parameter value;
    causing to be presented via a user interface a prompt to set at least one candidate configuration parameter based at least in part on the corresponding candidate configuration parameter value in the candidate configuration profile;

receiving via the user interface an indication of a response to the prompt to set the at least one configuration parameter; and generating by the at least one processor an instruction that causes the at least one configuration parameter to be set according to the received indication of the response.

12. The method of claim 11, further comprising:

determining the current states in the set of current states based upon a set of emission probabilities that relate the received at least one configuration parameter value to each current state in the set of current states.

13. The method of claim 12, further comprising:

updating at least one of the emission probabilities for at least one of the current states in the set of current states based at least in part upon the received indication of the response.

14. The method of claim 11, further comprising:

determining the candidate state based at least in part upon a transition probability that relates at least one of the current states in the set of current states to the candidate state.

15. The method of claim 14, further comprising:

updating at least one of the transition probabilities for at least one of the current states in the set of current states based at least in part upon the received indication of the response.

16. The method of claim 14 wherein at least one transition probability for at least one current states in the set of current states relates to remaining in the at least one current state.

17. The method of claim 14, further comprising:

determining a set of candidate states, wherein each candidate state within the set of candidate states is related to at least one of the current states in the set of current states by at least one transition probability.

18. The method of claim 17, further comprising:

determining the transition probability for each candidate state within the set of candidate states, wherein the at least one candidate configuration parameter that is presented in the prompt via the user interface corresponds to a candidate configuration parameter included with a candidate configuration profile related to a candidate state within the set of candidate states that has the highest transition probability.

19. The method of claim 18, further comprising:

updating at least one transition probability for one or more candidate states within the set of candidate states based at least in part upon the received indication of the response.

20. The method of claim 17 wherein the set of candidate states includes at least one of the current states within the set of current states.

* * * * *